(12) United States Patent
Fairchild et al.

(10) Patent No.: US 10,163,572 B2
(45) Date of Patent: Dec. 25, 2018

(54) CERAMIC-WOUND-CAPACITOR WITH LEAD LANTHANUM ZIRCONIUM TITANATE DIELECTRIC

(71) Applicant: DELPHI TECHNOLOGIES IP LIMITED, St. Michael (BB)

(72) Inventors: Manuel Ray Fairchild, Kokomo, IN (US); Ralph S. Taylor, Noblesville, IN (US); David W. Ihms, Russiaville, IN (US); Celine Wk Wong, Kokomo, IN (US)

(73) Assignee: DELPHI TECHNOLOGIES IP LIMITED (BB)

( * ) Notice: Subject to any disclaimer, the term of this patent is extended or adjusted under 35 U.S.C. 154(b) by 4 days.

(21) Appl. No.: 15/447,857

(22) Filed: Mar. 2, 2017

(65) Prior Publication Data

US 2017/0301472 A1   Oct. 19, 2017

Related U.S. Application Data

(60) Provisional application No. 62/323,893, filed on Apr. 18, 2016.

(51) Int. Cl.
*H01G 4/008* (2006.01)
*H01G 4/32* (2006.01)
(Continued)

(52) U.S. Cl.
CPC .............. *H01G 4/32* (2013.01); *H01G 4/008* (2013.01); *H01G 4/1227* (2013.01);
(Continued)

(58) Field of Classification Search
CPC ........ H01G 4/32; H01G 4/1245; H01G 4/008; H01G 4/12
(Continued)

(56) References Cited

U.S. PATENT DOCUMENTS 3,327,184 A * 6/1967 Valley ...................... H01G 4/22
                                                        29/25.42
3,380,854 A    4/1968 Robinson
(Continued)

FOREIGN PATENT DOCUMENTS

EP             2273517 A1     1/2011

OTHER PUBLICATIONS

Balu, et al: "Cost-Effective Fabrication of High-Temperature Ceramic Capacitors for Power Inverters", Dec. 1, 2015, 22 pages.

*Primary Examiner* — Eric Thomas
*Assistant Examiner* — Arun Ramaswamy
(74) *Attorney, Agent, or Firm* — Joshua M. Haines

(57) ABSTRACT

A ceramic-wound-capacitor includes a first-electrically-conductive-layer, a dielectric-layer, a second-electrically-conductive-layer, and a protective-coating. The dielectric-layer is formed of lead-lanthanum-zirconium-titanate (PLZT). The protective-coating has a thickness of less than ten micrometers (10 μm) and provides electrical isolation between the first-electrically-conductive-layer and the second-electrically-conductive-layer of the ceramic-wound-capacitor. A method for fabricating the ceramic-wound-capacitor includes the steps of feeding a carrier-strip, depositing a sacrificial layer, depositing a first-electrically-conductive-layer, depositing a dielectric-layer, and depositing a second-electrically-conductive-layer to form an arrangement coupled to the carrier-strip by the sacrificial-layer, separating the arrangement from the carrier-strip and sacrificial-layer, creating an exposed-surface of the first-electrically-conductive-layer, applying a protective-coating to the exposed-surface of the first-electrically-conductive-layer, winding the arrangement with the protective-coating to form a ceramic-wound-capacitor, where the protective-coating is in direct contact with the first-electrically-conductive-layer
(Continued)

and the second-electrically-conductive-layer of the ceramic-wound-capacitor.

7 Claims, 3 Drawing Sheets

(51) Int. Cl.
    *H01G 4/12*     (2006.01)
    *H01G 13/02*     (2006.01)
    *H01G 4/224*     (2006.01)

(52) U.S. Cl.
    CPC ........... *H01G 4/1245* (2013.01); *H01G 4/224* (2013.01); *H01G 13/02* (2013.01)

(58) Field of Classification Search
    USPC ............ 361/301.5, 321.1, 321.2, 321.3, 320; 156/89.12, 89.11
    See application file for complete search history.

(56) References Cited

U.S. PATENT DOCUMENTS

| | | | |
|---|---|---|---|
| 2004/0120098 A1* | 6/2004 | Yamazaki | ................ H01G 2/20 361/301.5 |
| 2010/0296224 A1* | 11/2010 | Yoshinaga | ............... H01G 4/32 361/301.5 |
| 2015/0364257 A1 | 12/2015 | Ma et al. | |

* cited by examiner

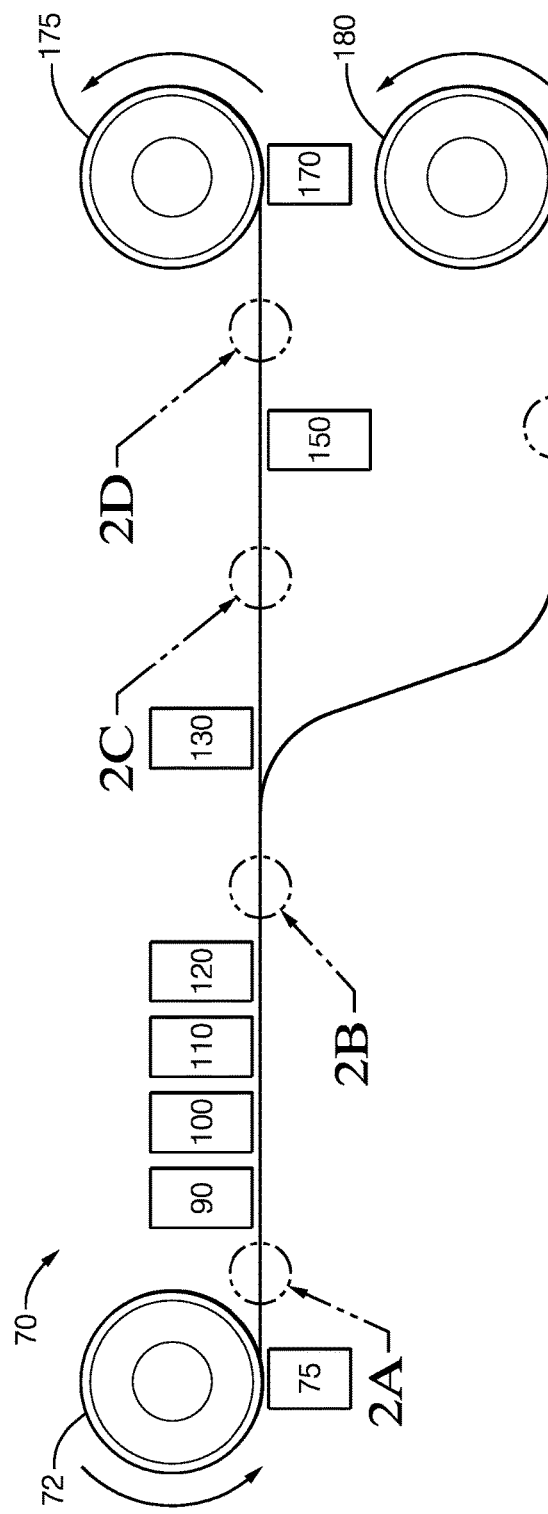
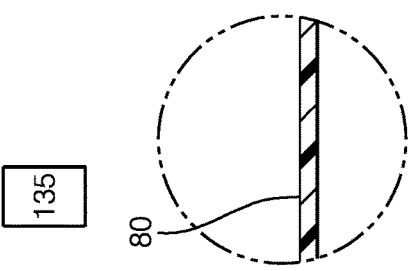
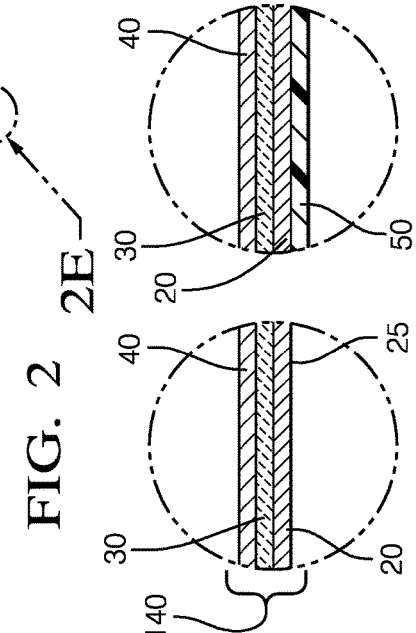
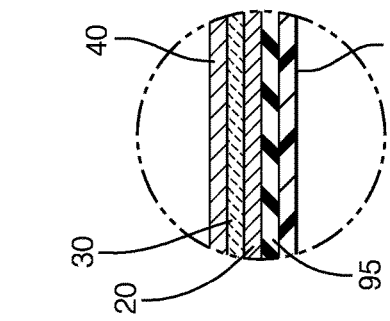
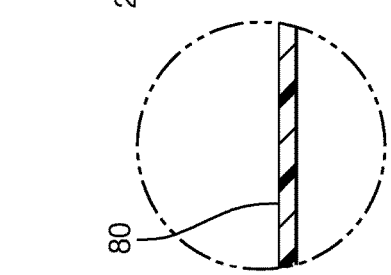
FIG. 2
FIG. 2A
FIG. 2B
FIG. 2C
FIG. 2D
FIG. 2E

CERAMIC-WOUND-CAPACITOR WITH LEAD LANTHANUM ZIRCONIUM TITANATE DIELECTRIC

CROSS-REFERENCE TO RELATED APPLICATION

This application claims the benefit under 35 U.S.C. § 119(e) of U.S. Provisional Patent Application No. 62/323,893, filed Apr. 18, 2016, the entire disclosure of which is hereby incorporated herein by reference.

GOVERNMENT LICENSE RIGHTS STATEMENT

This is an invention jointly developed by Argonne National Lab and Delphi Automotive System, LLC. The United States Government has rights in this invention pursuant to Contract No. DE-AC02-06CH11357 between the United States Government and UChicago Argonne, LLC representing Argonne National Laboratory and pursuant to Sub Contract No. 4F-31041 between the United States Government/Department of Energy (Argonne National Laboratory) and Delphi Automotive Systems, LLC.

TECHNICAL FIELD OF INVENTION

This disclosure generally relates to a ceramic-wound-capacitor, and more particularly relates to a ceramic-wound-capacitor with a lead-lanthanum-zirconium-titanate (PLZT) dielectric material.

BACKGROUND OF INVENTION

It is known that the class of high voltage, film wound-capacitors, used in today's electric vehicle invertors, require large packaging volumes. The primary feature driving the physical size of the film wound-capacitor is the thickness of the film upon which the capacitive elements are applied and subsequently wound. The film also performs the function of a substrate, or carrier-strip, during fabrication of the wound-capacitor. Typical carrier-strips are polymer materials that have thicknesses greater than 50 micrometers (50 µm), and are many times thicker than the layers that make up or form the capacitive elements. When wound, the thick carrier-strip becomes the largest contributor to the diameter of the finished capacitor. Disadvantageously, fabricating film wound-capacitors using thinner carrier-strips is more expensive, due to the increased cost of the thinner material, and due to the greater occurrence of film breakage during manufacturing, leading to increased equipment down-time. Another disadvantage of today's film capacitors, is that the service temperature is limited by the film material, which can be as low as 85 degrees Celsius (85° C.).

SUMMARY OF THE INVENTION

Described herein is a high voltage ceramic-wound-capacitor that can be wound without including the carrier-strip in the final assembly and is manufactured using film capacitor fabrication methods.

In accordance with one embodiment, a ceramic-wound-capacitor is provided. The ceramic-wound-capacitor includes a first-electrically-conductive-layer that defines an exposed-surface. The ceramic ceramic-wound-capacitor also includes a dielectric-layer formed of lead-lanthanum-zirconium-titanate (PLZT) in direct contact with the first-electrically-conductive-layer opposite the exposed-surface. The ceramic-wound-capacitor also includes a second-electrically-conductive-layer in direct contact with the dielectric-layer opposite the first-electrically-conductive-layer. The ceramic-wound-capacitor also includes a protective-coating in direct contact with the exposed-surface. The protective-coating is characterized by a thickness of less than 10 micrometers, wherein the first-electrically-conductive-layer, the dielectric-layer, the second-electrically-conductive-layer, and the protective-coating form a capacitive-element, and the capacitive-element is wound to form a ceramic-wound-capacitor.

In another embodiment, a method for fabricating the ceramic-wound-capacitor is provided. The method includes the step of feeding a carrier-strip. The method also includes the step of depositing a sacrificial layer. The method also includes the step of depositing a first-electrically-conductive-layer. The method also includes the step of depositing a dielectric-layer. The method also includes the step of depositing a second-electrically-conductive-layer to form an arrangement formed of the first-electrically-conductive-layer, the dielectric-layer, and the second-electrically-conductive-layer, with the arrangement coupled to the carrier-strip by the sacrificial-layer. The method also includes the step of separating the arrangement from the carrier-strip and sacrificial-layer, creating an exposed-surface of the first-electrically-conductive-layer. The method also includes the step of applying a protective-coating to the exposed-surface of the first-electrically-conductive-layer. The method also includes the step of winding the arrangement with the protective-coating to form a ceramic-wound-capacitor, where the protective-coating is in direct contact with the first-electrically-conductive-layer and the second-electrically-conductive-layer of the ceramic-wound-capacitor.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 2A-2E are a sequence of illustrations of an apparatus for fabricating the ceramic-wound-capacitor of FIG. 1 in accordance with one embodiment.

DETAILED DESCRIPTION

Figure 1:
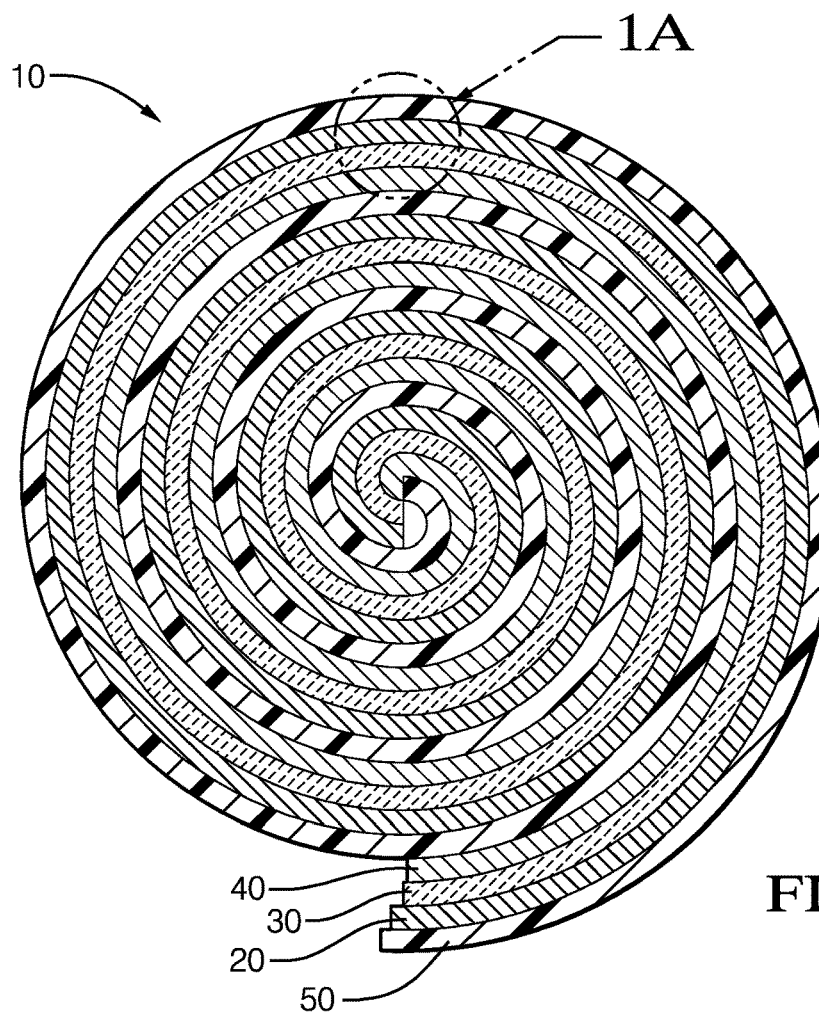
FIGS. 1-1A are a cross-sectional end view of a ceramic-wound-capacitor in accordance with one embodiment.
Figure 1A:
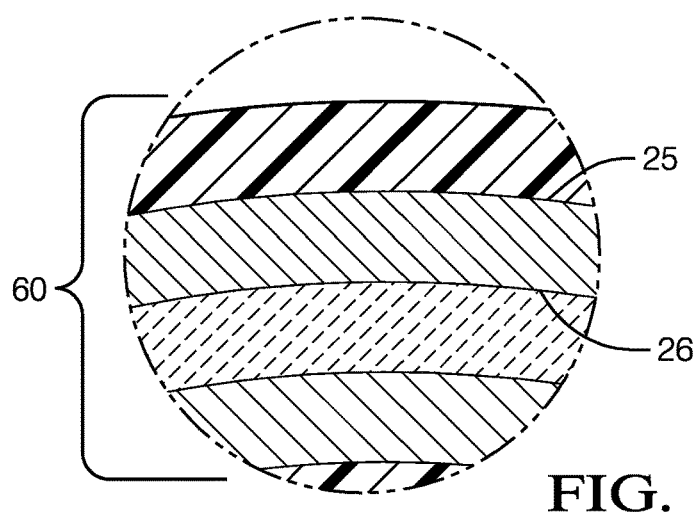

FIG. 1 illustrates a non-limiting example of a ceramic-wound-capacitor 10. The relative thickness of the layers illustrated is not meant to infer anything regarding relative thickness of the actual layers of materials used to form the ceramic-wound-capacitor 10, but are only shown to easier visualize the description presented below. Other features of the ceramic-wound-capacitor 10 that are contemplated, but not illustrated, such as contacts, wires, or terminations that electrically connect the ceramic-wound-capacitor 10 to other circuitry, as will be recognized by those skilled in the capacitor fabrication arts.

The ceramic-wound-capacitor 10 includes a first-electrically-conductive-layer 20. By way of example and not limitation, the first-electrically-conductive-layer 20 may be deposited by the known electron-beam evaporation process. Preferably the first-electrically-conductive-layer 20 is aluminum, with a thickness of 100 nanometers (nm) to a thickness of 200 nm, and preferably 120 nm. Alternatively, the first-electrically-conductive-layer 20 may be formed of platinum, copper, or nickel. The first-electrically-conductive-layer 20 preferably allows oxygen molecules to permeate its cross section.

A first-side of the first-electrically-conductive-layer 20 defines an exposed-surface 25. An opposite-side 26 of the first-electrically-conductive-layer 20 that is opposite the exposed-surface 25 is in direct contact with a dielectric-layer 30. The dielectric-layer 30 is advantageously formed of lead-lanthanum-zirconium-titanate (PLZT). PLZT is a ceramic material that has a high dielectric constant and is capable of operating at temperatures as high as 150° C. PLZT is generally considered to have a flat distribution of capacitance over voltage, frequency and temperature. Empirical testing has indicated that a thickness for the PLZT layer of 8 μm provides for a good balance between dielectric breakdown and reliability.

A second-electrically-conductive-layer 40, is in direct contact with the dielectric-layer 30, on the side opposite of the first-electrically-conductive-layer 20. Aluminum, with a thickness of 100 nanometers (nm) to a thickness of 200 nm, and preferably 200 nm, may form the second-electrically-conductive-layer 40. Alternatively, the second-electrically-conductive-layer 40 may be formed of platinum, copper, or nickel.

A protective-coating 50 of less than 10 μm is in direct contact with the exposed-surface 25 of first-electrically-conductive-layer 20. The protective-coating 50 may be formed of a poly-para-xylylene, such as one from the PARYLENE® family of coatings manufactured by Specialty Coating Systems of Somerville, N.J., USA. The thickness of the protective-coating 50 is ideally less than ten micrometers (10 μm), to minimize the diameter of the ceramic-wound-capacitor 10. The protective-coating 50 preferably allows oxygen molecules to permeate its cross section. The minimum thickness of the protective-coating 50 is dependent upon the designed maximum applied voltage across the ceramic-wound-capacitor 10, and the dielectric properties of the protective-coating-material, and can be calculated by one skilled in the art of capacitor design.

The first-electrically-conductive-layer 20, the dielectric-layer 30, the second-electrically-conductive-layer 40, and the protective-coating 50, form a capacitive-element 60, and the capacitive-element 60 is wound to form the ceramic-wound-capacitor 10. Upon winding the capacitive-element 60, the protective-coating 50 and the second-electrically-conductive-layer 40 are placed in direct contact.

By way of example, one non-limiting embodiment of a seven-hundred micro-Farad (700 μF) ceramic-wound-capacitor 10 would use a 2.4 μm thickness of a poly-para-xylylene for the protective-coating 50. The resulting capacitor would have a diameter of 6.0 centimeters (cm), compared to a diameter of 11.5 cm for the equivalent capacitor fabricated with a 50 μm thick carrier-strip 80 that is left in place. This results in a 48 percent reduction in the diameter of the capacitor, which translates into a 73 percent reduction in the volume of the ceramic-wound-capacitor 10, and would have a significant benefit in packaging the component.

Another non-limiting embodiment would utilize a layer of PLZT as the protective-coating 50. As with the poly-para-xylylene coating material previously described, the minimum thickness of the PLZT for the protective-coating 50 is dependent upon the designed maximum applied voltage across the ceramic-wound-capacitor 10, and the dielectric properties of the PLZT.

FIG. 2 illustrates a non-limiting example of an apparatus 70 to fabricate the ceramic-wound-capacitor 10. At step 75 (FIG. 3) a carrier-strip-feed-reel 72 feeds the carrier-strip 80 through a deposition process where at step 90 a sacrificial-layer 95 is deposited on top of the carrier-strip 80. At step 100 the first-electrically-conductive-layer 20 is deposited on top of the sacrificial-layer 95. At step 110 the dielectric-layer 30 is deposited on top of the first-electrically-conductive-layer 20. At step 120 the second-electrically-conductive-layer 40 is deposited on top of the dielectric-layer 30, thereby forming the arrangement 140. For clarity, the arrangement 140 is formed of the first-electrically-conductive-layer 20, the dielectric-layer 30, and the second-electrically-conductive-layer 40, and is coupled to the carrier-strip 80 by the sacrificial-layer 95. At step 130 the arrangement 140 is separated from the sacrificial-layer 95 and the carrier-strip 80, where the first surface of the first-electrically-conductive-layer 20 is exposed to create an exposed-surface 25. At step 150 the protective-coating 50 is deposited onto the exposed-surface 25, and the arrangement 140 with the protective-coating 50 is wound on the capacitor-take-up-reel 175 at step 170. Upon winding, the protective-coating 50 is placed in direct contact with the second-electrically-conductive-layer 40 to form the ceramic-wound-capacitor 10. The carrier-strip 80, after separation from the arrangement 140, is now devoid of the sacrificial-layer 95, and is collected on the carrier-strip-take-up-reel 180 at step 135, where it may be recycled to the beginning of the process.

Figure 3:
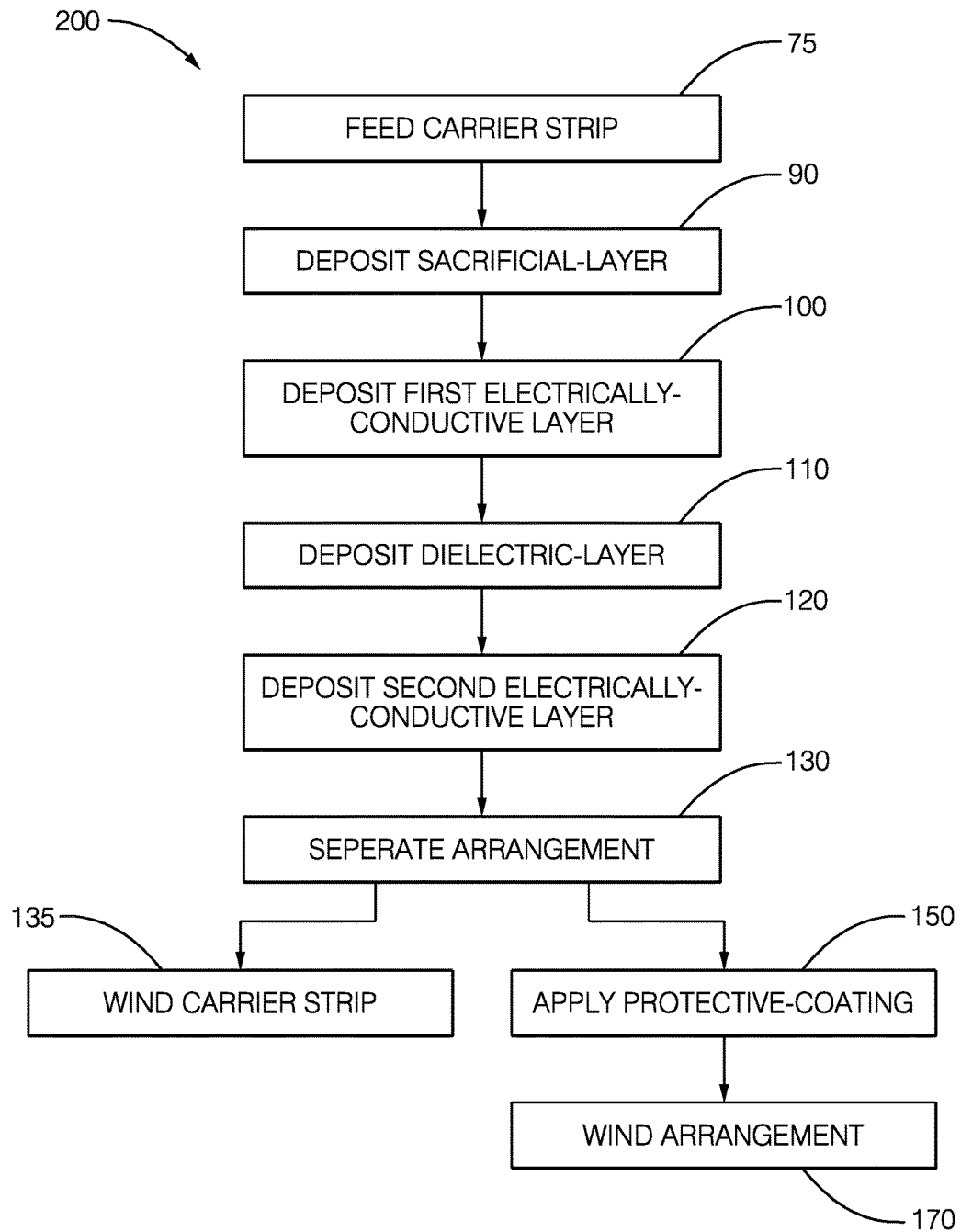
FIG. 3 is a flowchart of a method of fabricating the ceramic-wound-capacitor of FIG. 1 in accordance with one embodiment.

FIG. 3 illustrates a non-limiting example of a method 200 of fabricating the ceramic-wound-capacitor 10. In particular, the method 200 is used in conjunction with apparatus 70, to feed a carrier-strip 80 through a deposition process.

Step 75, FEED CARRIER STRIP, may include a carrier-strip 80 formed of a polymeric compound, such as a polyimide or a polyester, with a thickness of 50 μm. The width of the carrier-strip 80 may vary from the designed width for one instance of the ceramic-wound-capacitor 10, or several wound-capacitors to allow for a subsequent slitting operation.

Step 90, DEPOSIT SACRIFICIAL LAYER, may include a photoresist material, such as AZ4999® from AZ Electronic Materials Corporation of Somerville, N.J., USA. The photoresist may be applied using the manufacturer's spray, soft-bake and ultra-violet (UV) light exposure recommendations. The sacrificial-layer 95 with a thickness of 5 μm to a thickness of 15 μm, and preferably 10 μm, is adequate to provide a stable and flexible substrate on which to deposit the subsequent layers.

Step 100, DEPOSIT FIRST ELECTRICALLY CONDUCTIVE LAYER, may be one of platinum, nickel, copper, and aluminum, utilizing an evaporative deposition process, such as electron-beam evaporation. Preferably the first-electrically-conductive-layer 20 is aluminum, with a thickness of 100 nm to a thickness of 200 nm, and preferably 120 nm, which provides adequate electrical conductivity and flexibility. The first-electrically-conductive-layer 20 preferably allows oxygen molecules to permeate its cross section.

Step 110, DEPOSIT DIELECTRIC LAYER, is performed by an aerosol spray process at a temperature between 10 degrees Celsius and 38 degrees Celsius. The dielectric-layer 30 is advantageously formed of PLZT. PLZT is a ceramic material that has a high dielectric constant and is capable of operating at temperatures as high as 150° C. The PLZT has a flat distribution of capacitance over voltage, frequency and temperature. Empirical testing has indicated that a thickness for the PLZT layer of 8 µm provides for a good balance between dielectric breakdown and reliability. This deposition process is desirable in that the PLZT material is a ceramic that would typically require a firing process in excess of 650° C. to sinter the particles into a solid monolithic structure. The aerosol spray process creates friction between the air-born ceramic PLZT particles to generate the required heat to sinter the particles together upon deposition onto the first-electrically-conductive-layer 20. Using conventional ceramic processing methods, the firing temperatures required to sinter the PLZT particles, would melt the carrier-strip 80 when formed of a polymer. Advantageously, it is the ability to deposit the PLZT at temperatures below the melting point of the carrier-strip 80 when formed of polymer that enables the film processing method 200 described herein.

Step 120, DEPOSIT SECOND ELECTRICALLY CONDUCTIVE LAYER, may be one of platinum, nickel, copper, and aluminum, utilizing an evaporative deposition process, such as electron-beam evaporation. Aluminum, with a thickness of 100 nanometers (nm) to a thickness of 200 nm, and preferably 200 nm, may form the second-electrically-conductive-layer 40, and provides adequate electrical conductivity and flexibility.

Step 130, SEPARATE ARRANGEMENT, may include the use of a solvent to dissolve the sacrificial-layer 95, such as AZ Kwik Strip® manufactured by AZ Electronic Materials Corporation of Somerville, N.J., USA. The solvent may be applied by spray, or by immersion of the arrangement 140 coupled to the carrier-strip 80 into a solvent bath, and does not deleteriously affect the capacitive-element 60. After separation from the arrangement 140, the carrier-strip 80 is now devoid of the sacrificial-layer 95.

Step 135, WIND CARRIER STRIP, the carrier-strip 80 is collected on the carrier-strip-take-up-reel 180 where it can be recycled to the beginning of the process.

Step 150, APPLY PROTECTIVE COATING, may utilize a spray process of a poly-para-xylylene, such as one from the PARYLENE® family of coatings manufactured by Specialty Coating Systems of Somerville, N.J., USA. The thickness of the protective-coating 50 is ideally less than ten micrometers (10 µm), to minimize the diameter of the ceramic-wound-capacitor 10. The protective-coating 50 preferably allows oxygen molecules to permeate its cross section. The minimum thickness of the protective-coating 50 is dependent upon the designed maximum applied voltage across the ceramic-wound-capacitor 10, and the dielectric properties of the protective-coating-material, and can be calculated by one skilled in the art of capacitor design.

Step 170, WIND ARRANGEMENT, is conducted by a capacitor-take-up-reel 175. The ceramic-wound-capacitor 10 is wound to a predetermined diameter, based on the desired capacitance of the ceramic-wound-capacitor 10. Alternatively, the arrangement 140 may be wound onto a spool for processing into individual capacitors at a later time. Upon winding the capacitive-element 60, the protective-coating 50 and the second-electrically-conductive-layer 40 are placed in direct contact.

Accordingly, a ceramic-wound-capacitor 10, an apparatus 70 for winding the ceramic-wound-capacitor 10, and a method 200 for winding a ceramic-wound-capacitor 10 is provided. By eliminating the carrier-strip 80 from the final capacitor assembly, a smaller diameter ceramic capacitor can be fabricated using a polymer film manufacturing process.

While this invention has been described in terms of the preferred embodiments thereof, it is not intended to be so limited, but rather only to the extent set forth in the claims that follow.

We claim:

1. A method for fabricating a ceramic-wound-capacitor, said method comprising:
   providing an apparatus configured to feed a carrier-strip through a deposition-process, wherein the deposition-process includes;
   depositing a sacrificial-layer on top of the carrier-strip;
   depositing a first-electrically-conductive-layer on top of the sacrificial-layer;
   depositing a dielectric-layer of lead-lanthanum-zirconium-titanate (PLZT) on top of the first-electrically-conductive-layer;
   depositing a second-electrically-conductive-layer on top of the dielectric-layer, thereby forming an arrangement formed of the first-electrically-conductive-layer, the dielectric-layer, and the second-electrically-conductive-layer, said arrangement coupled to the carrier-strip by the sacrificial-layer; then
   separating the arrangement from the carrier-strip and the sacrificial-layer to define an exposed-surface of the first-electrically-conductive-layer opposite the dielectric-layer;
   applying a protective-coating to the exposed-surface; and
   winding the arrangement with the protective-coating to form a ceramic-wound-capacitor.

2. The method of claim 1, wherein depositing the PLZT is performed at a temperature between 10 degrees Celsius and 38 degrees Celsius.

3. The method of claim 1, wherein the carrier-strip is a polymeric compound.

4. The method of claim 2, wherein the polymeric compound is one of polyimide and polyester.

5. The method of claim 1, wherein the carrier-strip is collected by the apparatus after separating the carrier-strip from the arrangement.

6. The method of claim 1, wherein winding the arrangement places the protective-coating in direct contact with the second-electrically-conductive-layer.

7. The method of claim 1, wherein depositing the dielectric-layer includes spraying the PLZT.

* * * * *